United States Patent [19]
Johnson

[11] 3,721,170
[45] March 20, 1973

[54] APPARATUS FOR ADAPTING A REFLEX CAMERA TO USE WITH A MONOCULAR MICROSCOPE

[75] Inventor: Bruce K. Johnson, Andover, Mass.
[73] Assignee: Polaroid Corporation, Cambridge, Mass.
[22] Filed: April 25, 1972
[21] Appl. No.: 247,410

[52] U.S. Cl. ..........................95/12, 355/68, 350/18
[51] Int. Cl. ..............................................G03b 29/00
[58] Field of Search ................95/12; 355/68; 350/18

[56] References Cited
UNITED STATES PATENTS
2,659,268  11/1953  Grand ......................................350/18

Primary Examiner—John M. Horan
Attorney—Frederick H. Brustman et al.

[57] ABSTRACT

An apparatus for attaching a reflex camera, with an automatic exposure control, to a standard monocular microscope is disclosed. The apparatus includes a self-centering clamp to attach it to the draw tube of a monocular microscope and a support for holding the camera in alignment with the optic axis of the microscope. The support contains an eyepiece modified to provide a way of operating the camera's automatic exposure control and an optional polarizer for dark field microscopy. It does not interfere with the camera's automatic operation.

2 Claims, 3 Drawing Figures

PATENTED MAR 20 1973

APPARATUS FOR ADAPTING A REFLEX CAMERA TO USE WITH A MONOCULAR MICROSCOPE

BACKGROUND OF THE INVENTION

The present invention pertains to photographic recording in microscopy. Microscopists have long valued the convenience of photographing their specimens using the magnifying powers of a microscope. However, such photography generally requires special cameras and/or microscopes and proves inconvenient to change the complex and expensive accessories usually used.

SUMMARY OF THE INVENTION

The apparatus described herein as the preferred embodiment of the invention adapts a novel reflex camera for use with a standard monocular microscope. The reflex camera that this apparatus is used with is of the automatic type. It includes an automatic exposure control and a means for processing and ejecting a photographic image. The apparatus contains a microscope eyepiece modified by the insertion therein of a beam splitter. The beam splitter extracts a few percent of the light from the image and reflects it to a mirror. The mirror reflects the extracted light up, through a field lens, into the camera's automatic exposure control. The field lens concentrates the extracted light on the photocell of the exposure control.

To attach the apparatus onto a monocular microscope, it is lowered over the draw tube until the bottom of the eyepiece enters the draw tube and then a self-centering clamp at the lower end of the apparatus is tightened so it grasps the draw tube.

A receptacle at the top of the apparatus receives the reflex camera and positions it over the eyepiece and in optical alignment with it. Access areas formed in the receptacle walls permit manipulation of the camera controls while it is in position over a microscope. A cutaway portion at the rear of the apparatus allows the camera to eject a processed print without the need for lifting the camera off the apparatus that holds it over the monocular microscope.

The camera photographs the exact image an observer would see looking through the monocular microscope. He can still use the microscope with the camera in place by means of the camera's reflex viewfinder except during an actual exposure.

An object of this invention is to provide an apparatus for adapting an automatic camera to taking pictures through a monocular microscope.

Another object of this invention is an apparatus, for adapting a camera to a monocular microscope, having a self-centering clamp.

DESCRIPTION OF THE DRAWING

Other objects and many of the attendant advantages of the present invention will be better appreciated and said invention will be clearly understood by reference to the following detailed description when considered in conjunction with the accompanying drawing illustrating one embodiment of the instant invention, wherein.

DESCRIPTION OF THE PREFERRED EMBODIMENT

Figure 1:
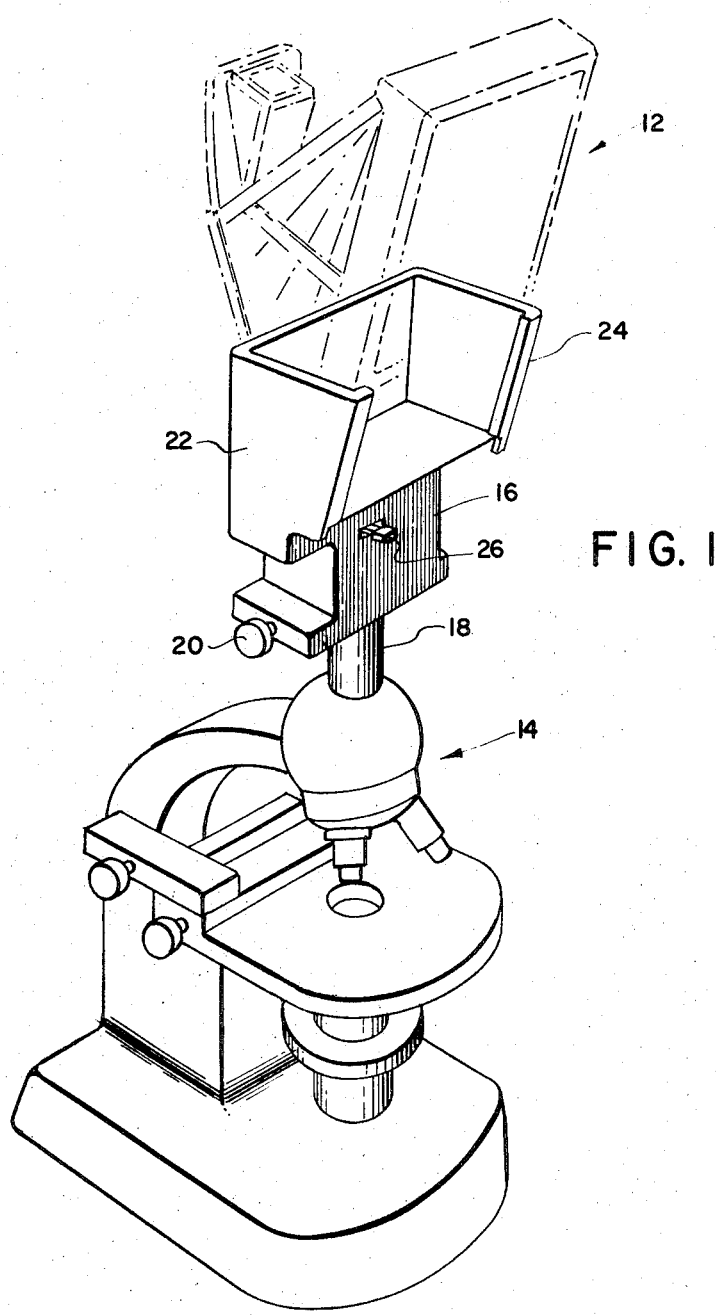
FIG. 1 illustrates the apparatus supporting an automatic reflex camera on a monocular microscope.

FIG. 1 shows an adaptor 10, according to the present invention, holding an automatic reflex camera 12 in position over a monocular microscope 14. The adaptor 10 comprises a base 16 that slips over a draw tube 18 of the microscope 14. Inside the lowest part of the base 16 is a self-centering draw tube clamp (not shown in FIG. 1) actuated by the thumb screw 20. A pair of brackets 22 and 24 extending upwardly retain the reflux camera 12 in position over the draw tube 18. A lever 26 permits a microscopist to insert a polarizer in the optical path when required for dark field studies.

Figure 2:
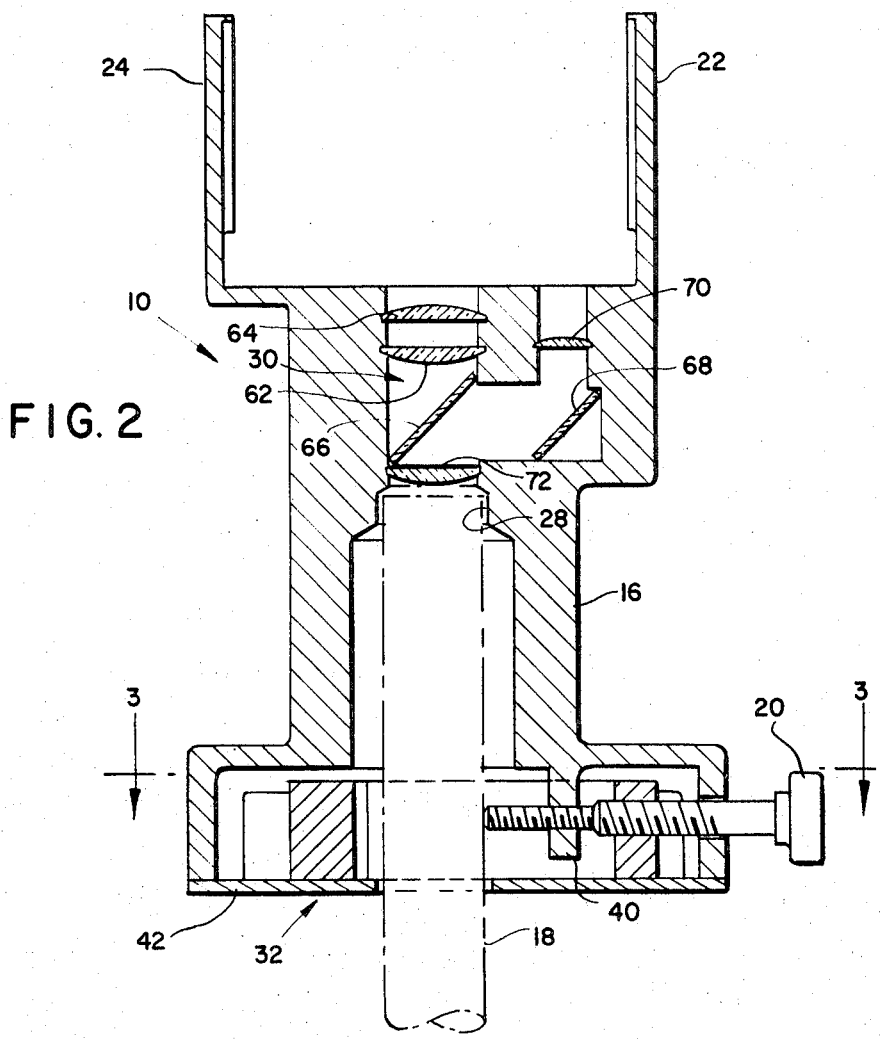
FIG. 2 reveals the interior light path and the relation of certain parts inside the apparatus.

Reference to FIG. 2 will clarify the internal optical arrangement of the adaptor 10. Inside the base 16 a pilot hole 28 centers the top of the draw tube 18 with the optics 30 of the adaptor. In the bottom of the base 16 the self-centering draw tube clamp 32 aligns the lower part of the draw tube concentrically with the base 16. The draw tube clamp 32 comprises: the thumb screw 20; a sliding vee block 34; sliding ways 30 and 38; a nut 40; and a retainer plate 42 to hold the parts of the clamp 32 inside the base 16.

Figure 3:
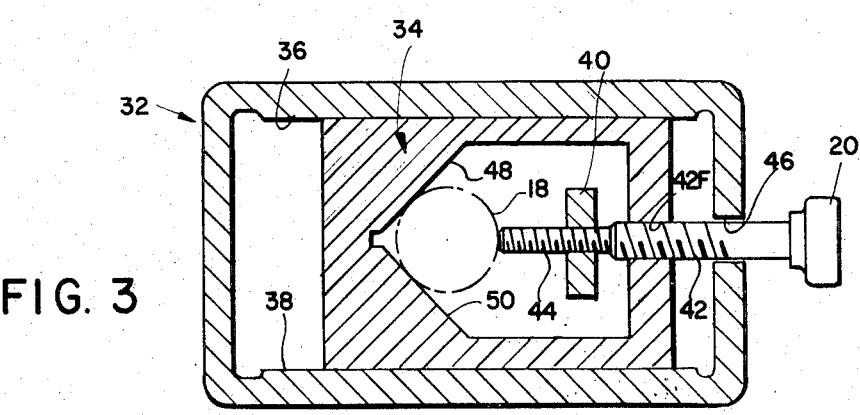
FIG. 3 illustrates the self-centering draw tube clamp.

For a fuller understanding of the self-centering draw tube clamp 32's operation, reference should also be had to FIG. 3 as well as FIG. 2. The thumb screw 20 has two threads 42 and 44 each with a different pitch. The thread 44 engages the nut 40 that extends from the base 16 and the other thread 42 engages a mating female thread 42F forming part of the vee block 34. A clearance hole 46 in the base 16 allows the thumb screw 20 to move freely through it. Turning the thumb screw 20 clockwise causes it to advance through the nut 40 toward the draw tube 18, carrying the vee block 34 to the left with it. However, the rotation of the male screw 42 in the female screw 42F causes the vee block to advance toward the right, i.e., toward the draw tube 18. Both screws 42 and 44 are the same hand. The vee block 34 slides along between the ways 36 and 38 held in place by the retainer plate 42. From the foregoing, one will now understand that the net rightward motion of the vee block 34 depends on the differences in pitch between the screws 42 and 44. One must keep in mind that the embodiment illustrated in FIG. 3 has the jaw faces 48 and 50 of the vee block 34 oriented at 45 degrees to their direction of movement. Consequently, the vee block 34 must move 1.414 times more per rotation of the thumb screw 20 than the linear motion of the thumb screw if the clamp is to be self-centering. To compensate for the leftward movement of the thumbscrew 20 as it threads through the nut 40 a factor of one must be added. Thus, the screw head 42 should have 2.414 times as many threads per centimeter than the screw thread 44.

Refer back to FIG. 2 for an understanding of the optics 30 situate inside the base 16. The optics 30 comprise a field lens 60 and eye lenses 62 and 64. The field lens 60 and the eye lenses 62, 64 are arranged as in a common monocular microscope eyepiece to form a virtual image for viewing, or photographing, about 50 centimeters away from the image formed by the monocular microscope 14's objective. Between the lenses 60 and 62 is a beam splitter 66. The beam splitter 66 is uncoated so it reflects only a few percent of the light out of the main (vertical) light path. The light reflected by the beam splitter 60 reflects upwardly from a mirror 68 into another field lens 70.

The brackets 22 and 24 position the reflex camera 16 (not shown in FIG. 2) over the optics 30 and in alignment with them so the major portion of the light, that passing through the lens 60, 62, and 64 enters the objective lens of the reflex camera. The field lens 70 directs the small percent of light passing through it onto the photocell (not shown) of the camera's automatic exposure system. By means of that light the exposure control will function.

One can view the image formed by the monocular microscope through a viewer on the camera. The camera photographs the virtual image formed by the eyepiece optics 60, 62, and 64. It should be understood that a standard monocular microscope eyepiece can be used in the adaptor 10 instead of the lens 60, 62, and 64 if it is modified with a beam splitter as indicated.

In the embodiment shown, a polarizer 72 can be slid into the main optical path, between the beam splitter 66 and the field lens 60, by the lever 26 (see FIG. 1) to make dark field photographs (i.e., for polarization microscopy). Experimentally it has been determined that the transmission azimuth of the polarizer 72 should have an orientation minimizing the amount of light reflected by the beam splitter 66. This yields better exposures for dark field studies than the orthogonal orientation yields.

It can be readily understood that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that, within the scope of the appended claims, the instant invention may be practiced in a manner otherwise than specifically described herein.

What is claimed is:

1. An apparatus for attaching an automatic reflex camera, having an automatic exposure control, to a monocular microscope, comprising:
    an eye lens;
    a field lens, situate below said eye lens on a common optic axis, the combination of said eye lens and said field lens functioning as a microscope eyepiece;
    a beam splitter positioned between said eye lens and said field lens to reflect a small amount of the light incident thereon towards a mirror;
    a mirror, situate to the side of said optic axis, for reflecting said small amount of light parallel to said optic axis and into a condensing lens;
    a condensing lens positioned to refract the light incident thereon into a photocell of said automatic exposure control;
    a housing to retain the foregoing elements in the recited relations with each other and to exclude extraneous light therefrom;
    guide means, inside said housing and proximate said field lens, for aligning said optic axis with the axis of said monocular microscope;
    self-centering clamp means, at the lowermost part of said housing and aligned with said guide means, for attaching said housing to said draw tube; and
    a pair of brackets extending upwardly from the sides of said housing for holding said camera over said eye lens and in optical alignment therewith.

2. The apparatus described in claim 1, further comprising a linear polarizing filter and means for removably inserting it in the path of light passing between said field lens and said beam splitter.

* * * * *